United States Patent [19]

Masaki

[11] Patent Number: 5,053,989

[45] Date of Patent: Oct. 1, 1991

[54] DIGITAL IMAGE PROCESSING APPARATUS HAVING A MICROPROGRAM CONTROLLER FOR READING MICROINSTRUCTIONS DURING A VACANT PERIOD OF THE IMAGE PROCESSING CIRCUIT

[75] Inventor: Yasuo Masaki, Kitakatsuragi, Japan

[73] Assignee: Minolta Camera Kabushiki Kaisha, Osaka, Japan

[21] Appl. No.: 89,558

[22] Filed: Aug. 26, 1987

[30] Foreign Application Priority Data

Aug. 27, 1986 [JP] Japan .............................. 61-201074
Aug. 27, 1986 [JP] Japan .............................. 61-201075
Aug. 27, 1986 [JP] Japan .............................. 61-201076

[51] Int. Cl.[5] .......................... G06F 9/22; G06F 9/28
[52] U.S. Cl. ................................ 364/900; 364/931.4; 364/931.41; 364/931.44; 364/938.1; 364/938.3; 364/933.2; 364/942.4; 364/946.6; 364/949.1; 364/950.2; 364/950.3
[58] Field of Search ............... 364/518, 519, 521, 200, 364/900

[56] References Cited

U.S. PATENT DOCUMENTS

| | | | |
|---|---|---|---|
| 4,103,331 | 7/1978 | Thacker | 364/200 |
| 4,104,624 | 8/1978 | Hamada | 340/799 |
| 4,149,264 | 4/1979 | Hamada et al. | 364/900 |
| 4,203,154 | 5/1980 | Lampson et al. | 364/900 |
| 4,205,389 | 5/1980 | Heartz | 364/900 |
| 4,490,848 | 12/1984 | Beall et al. | 382/85 |
| 4,493,105 | 1/1985 | Beall et al. | 382/85 |
| 4,496,944 | 1/1985 | Collmeyer et al. | 340/747 |
| 4,511,928 | 4/1985 | Colomb | 364/519 |
| 4,597,043 | 6/1986 | Pasierb, Jr. | 364/200 |
| 4,642,757 | 2/1987 | Sakamoto | 364/200 |
| 4,653,110 | 5/1987 | Urushibata et al. | 382/41 |
| 4,691,282 | 9/1987 | Kinoshita | 364/200 |
| 4,736,330 | 4/1988 | Capowski | 364/521 |
| 4,757,310 | 7/1988 | Katsura et al. | 340/750 |
| 4,768,157 | 8/1988 | Chauvel et al. | 364/521 |
| 4,779,210 | 10/1988 | Katsura et al. | 364/900 |
| 4,779,223 | 10/1988 | Asai et al. | 364/900 |
| 4,816,817 | 3/1989 | Herrington | 340/801 |
| 4,839,828 | 6/1989 | Elsner et al. | 364/518 |
| 4,862,150 | 8/1989 | Katsura et al. | 364/521 |
| 4,862,392 | 8/1989 | Steiner | 364/521 |
| 4,906,986 | 3/1990 | Takeda | 340/799 |

OTHER PUBLICATIONS

Ralston, Anthony and Edwin D. Reilly, Jr., Loop and Program Counter, *Encyclopedia of Computer Science and Engineering*, pp. 884–885 and 1220–1221 (2nd Ed. 1983).

"8080 Instruction Set," *The 8080/8085 Microprocessor Book*, pp. 38–54 (1980).

*Primary Examiner*—Gareth D. Shaw
*Assistant Examiner*—Matthew C. Fagan
*Attorney, Agent, or Firm*—Burns, Doane, Swecker & Mathis

[57] ABSTRACT

A microprogram loaded in a microprogram memory by a host CPU is read out by a microprogram read control circuit in a vacant period existing in each cycle of operation of a hardware unit, whereby the microprogram is transmitted to each circuit of the hardware unit through a microprogram read-only bus. Each circuit of the hardware unit comprises a decoder and operation thereof is controlled based on a microinstruction decoded by the decoder.

16 Claims, 16 Drawing Sheets

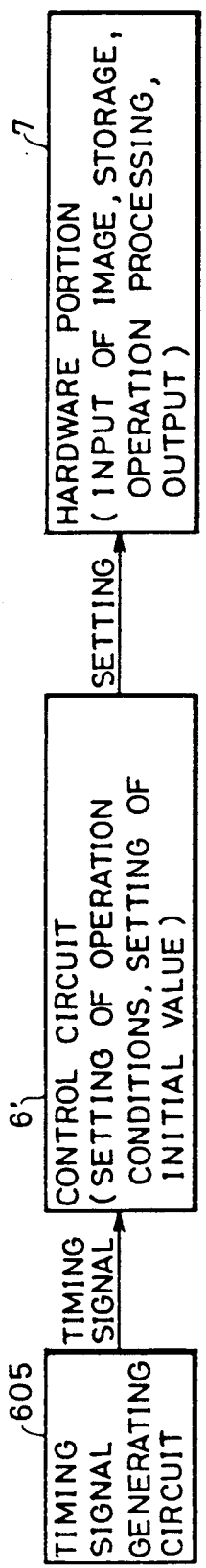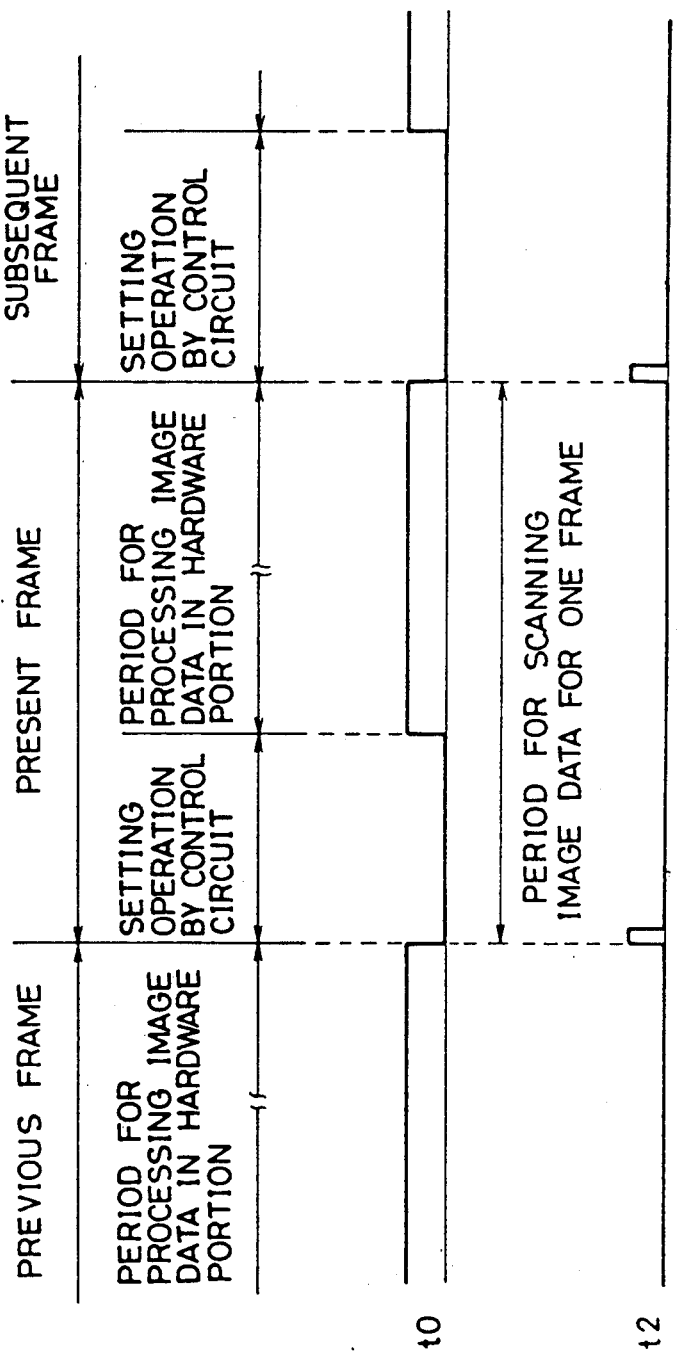

DIGITAL IMAGE PROCESSING APPARATUS HAVING A MICROPROGRAM CONTROLLER FOR READING MICROINSTRUCTIONS DURING A VACANT PERIOD OF THE IMAGE PROCESSING CIRCUIT

BACKGROUND OF THE INVENTION

1. Field of the Invention

The present invention relates to a digital image processing apparatus for performing operation processing of original image data, to execute image data conversion processing such as correction of gradation or increase of sharpness of the image and other processing such as feature extraction from the original image data.

2. Description of the Prior Art

FIG. 1 is a block diagram showing an example of a conventional digital image processing apparatus. This conventional digital image processing apparatus comprises a host central processing unit (CPU) 1, an image input circuit 2, an image memory 3, an operation processing circuit 4, an image output circuit 5, a host CPU bus L1 and an image data bus L2. Pluralities of image input circuits 2, image memories 3, operation processing circuits 4 and image output circuits 5 may be provided as required. This image processing apparatus performs three fundamental functions, i.e. image data input processing, image data operation processing and image data output processing.

(1) Image data input processing is performed by writing image data applied from the image input circuit 2 into the image memory 3 through the image data bus L2.

(2) Image data operation processing is performed in a manner in which the image data read out from the image memory 3 is inputted to the operation processing circuit 4 through the image data bus L2 to be subjected to operation processing and the data obtained therefrom is written in the image memory 3 through the image data bus L2.

(3) Image data output processing is performed in a manner in which the image data read out from the image memory 3 is supplied to the image output circuit 5 through the image data bus L2 and outputted to an external apparatus such as an image display or an image recorder.

According to the respective functions, the image input circuit 2, the image memory 3, the operation processing circuit 4 and the image output circuit 5 need to have prescribed input and output relations with the image data bus L2 and need to be set to prescribed operation conditions. More specifically, in order to perform a desired image processing function, it is necessary to set those circuits included in a hardware portion to prescribed operation conditions. In addition, in order to perform different image processing functions successively, it is necessary to renew setting of operation conditions successively.

In the conventional apparatus in FIG. 1, such setting of operation conditions is effected in software processing of the host CPU 1 by allotting I/O areas of the host CPU 1 for condition setting of the hardware to be controlled. In this case, all of the control operations, including control of desired image processing based on algorithm and setting of detailed conditions of the hardware, depend on the software processing of the host CPU 1. Consequently, the proportion of the whole area of the image processing software of the host CPU 1 assigned for control of the hardware becomes large and accordingly, the software area is increased. Thus, there is a large dependency of the software on the hardware. In addition, it is difficult to achieve high-speed control of the hardware since it is necessary to fetch a program for control of the hardware.

In order to solve the above described problems, digital image processing apparatuses as described below have been proposed. More specifically, in one of such digital image processing apparatuses, a control circuit for controlling a hardware portion is provided between the host CPU having control of software processing and the hardware portion performing actual image processing. A microprogram concerning control information for the respective circuits of the hardware portion is stored in a microprogram memory provided in the control circuit. Thus, if the microprogram is read out from the microprogram memory in response to a processing request of the host CPU, necessary control of the hardware portion is performed in the control circuit to execute a prescribed image processing function. FIG. 2A is a block diagram showing another conventional example of the above mentioned proposed digital image processing apparatuses. Referring to FIG. 2A, a control circuit 6 is provided between the host CPU bus L1 and the hardware circuits 2 to 5 to be controlled. The control circuit 6 interprets a control request from the host CPU 1 and provides control signals corresponding to the respective hardware circuits 2 to 5.

FIG. 2B shows an internal construction of the control circuit 6 shown in FIG. 2A. The control circuit 6 comprises a command decoder 601, a microprogram memory read control circuit 602, a microprogram memory 603 and a microprogram decoder 604. The host CPU 1 does not perform control operations for the respective hardware circuits and supplies codes to the command decoder 601 according to contents of processing. The command decoder 601 decodes the supplied codes and operates the microprogram memory read control circuit 602 according to the decoded contents. The microprogram memory read control circuit 602 is brought into two states, i.e. a stop state and a state in which an address for reading of the microprogram memory 603 is provided. Commands provided from the command decoder 601 represent in principle requests for selecting either of the two states, i.e. a request for beginning to read the microprogram memory 603 and a request for stopping of the reading.

The microprogram memory 603 receives a read address, a read permission signal and the like from the microprogram memory read control circuit 602 and reads the microprogram. The thus read microprogram is supplied to the microprogram decoder 604. The microprogram decoder 604 decodes the supplied microprogram and generates a control signal in a form necessary for the hardware circuits.

According to the above described control system, the proportion assigned for hardware control in the software of the host CPU 1 is considerably decreased and the software depends less on the hardware. In addition, the hardware portion can be controlled at higher speed.

Thus, the control information for the hardware portion is microprogrammed, which makes it possible to decrease the workload of the host CPU 1 and to perform processing at high speed. However, the conventional apparatus shown in FIGS. 2A and 2B involves a disadvantage that design of the controlled hardware circuits 2 to 5 has little flexibility. More specifically, if a modification is made or a new component is added in one of the controlled hardware circuits 2 to 5, it is necessary to change the circuit configuration of the microprogram decoder 604 according to such modification o addition and it is also necessary to change or add control signal lines between the control circuit 6 and the controlled hardware circuits 2 to 5, which is troublesome. Thus, it is considerably difficult to add a new circuit to the hardware circuits or to change the hardware circuits.

In addition, such a conventional microprogrammed control system of a digital image processing apparatus has a problem that a loss in time for control of the hardware portion is caused because there is no means for synchronization between operation timing of the hardware portion concerning, for example, a period for reading image data of a pixel or a frame from an image memory and timing for control of reading of a microprogram from a microprogram memory, decoding of the microprogram by the microprogram decoder or the like. For example, in a system in which access to an image memory is effected by raster scanning of a prescribed cycle and all the other hardware circuits operate dependent on the prescribed cycle, if no synchronization is effected between timing for control operation and the cycle of raster scanning, a period corresponding to one cycle or two cycles of raster scanning is required only for the control operation even if the period actually for the control is very short.

In addition, in the conventional apparatus shown in FIGS. 2A and 2B, the microprogram in the microprogram memory 603 is formed simply by programming, as microinstructions, a sequence of control instructions for the controlled hardware circuits 2 to 5, and processing related to the algorithms of image processing, such as combination of different microprograms or repetitive execution of the same microprogram, is performed by software processing of the host CPU 1. Thus, software processing by the host CPU 1 occurs during a plural number of microprogram reading operations, causing a delay in control operation for the controlled hardware circuits 2 to 5. In order to decrease the number of occurrences of software processing, it is necessary to combine, as required, a plurality of microprograms existing independently in the microprogram memory 603 or to utilize the same microprogram for a plural number of times. For doing so, it is necessary to provide not only the control instructions for the hardware circuits 2 to 5, but also microinstructions for reading control of the microprogram, such as jumping instructions, condition determining instructions, subroutine call instructions or return instructions from the subroutines, indispensable for software processing, and it is also necessary to make the microprogram decoder in the control circuit have a function of decoding those reading control microinstructions.

SUMMARY OF THE INVENTION

An object of the present invention is to provide a digital image processing apparatus which does not require change or addition of any component or line in a control circuit or control signal lines if the circuit configuration is changed or a new circuit is added in the hardware portion to be controlled.

Another object of the present invention is to provide a digital image processing apparatus capable of performing, without any loss in time, setting operations such as setting of operation conditions or initial values for the hardware portion such that the setting operation is performed in a period in which image data is not processed in the hardware portion.

A further object of the present invention is to provide a digital image processing apparatus in which procedures of reading the microprograms are controlled by control information obtained by decoding microinstructions read out from a microprogram memory, which makes it possible to utilize with high efficiency the respective microprograms existing in the microprogram memory and to increase control speed by decreasing frequency of utilization of software processing of a host CPU during control of the hardware portion.

Briefly stated, according to a first aspect of the present invention, a digital image processing apparatus comprises a microprogram memory and a microprogram read control circuit between a central processing unit (referred to hereinafter as CPU) and a hardware portion to be controlled, so that a microprogram read out from the microprogram memory by means of the microprogram read control circuit is transmitted to the hardware portion through a microprogram read-only bus. The hardware portion comprises a decoder for decoding microinstructions in the microprogram and operation of the hardware portion is controlled by the microinstructions decoded by the decoder.

According to a second aspect of the present invention, a digital image processing apparatus comprises: an image information processing circuit for processing image information in synchronism with a prescribed cycle; timing signal generating means for generating a timing signal for designating a vacant period (in which the image information processing circuit is not operated) in each cycle; and control information setting means for setting control information for controlling operation of the image information processing circuit. The control information setting means operates in response to the above mentioned timing signal to set control information in the image information processing circuit for a subsequent operation period by making use of the vacant period of each cycle.

According to a third aspect of the present invention, a digital image processing apparatus comprises a microprogram memory, a microprogram read control circuit, a CPU, an image information processing circuit and a microprogram decoder. The CPU at least sets a microprogram in the microprogram memory and controls the microprogram read control circuit. The microprogram decoder decodes the microprogram read out from the microprogram memory and prepares control information for controlling operation of the microprogram read control circuit. The microprogram read control circuit comprises an address counter for generating a read address of the microprogram memory and initial value setting means for setting an initial value in the address counter. The initial value setting means sets the initial value of the address counter based on outputs of the CPU and the microprogram decoder.

According to the first aspect of the present invention, if a circuit configuration is changed or a new circuit is added in the hardware portion, adding or changing any component or any signal line in the control circuit or control signal lines is not required.

According to the second aspect of the present invention, control information can be set in the image information processing circuit without causing any loss of time.

According to the third aspect of the present invention, setting of the initial value of the address counter for supplying a read address to the microprogram memory can be effected not only by the CPU but also by control information obtained as a result of decoding a microprogram by means of the microprogram decoder. Accordingly, procedures for reading the microprogram can be controlled by microinstructions read out from the microprogram memory, independent of software processing in the CPU and thus the respective microprograms in the microprogram memory can be utilized efficiently. At the same time, the workload of the CPU required for control of the image information processing circuit can be decreased, which leads to an improvement of a control speed of the CPU.

These objects and other objects, features, aspects and advantages of the present invention will become more apparent from the following detailed description of the present invention when taken in conjunction with the accompanying drawings.

BRIEF DESCRIPTION OF THE DRAWINGS

FIGS. 3B and 3C are a block diagram and a timing chart, respectively, for explaining a second feature of the embodiment.

DESCRIPTION OF THE PREFERRED EMBODIMENTS

An embodiment of the present invention will be described in the following. Prior to a detailed description of the embodiment, three features of the embodiment will be described with reference to FIGS. 3A to 3D.

Figure 3A:
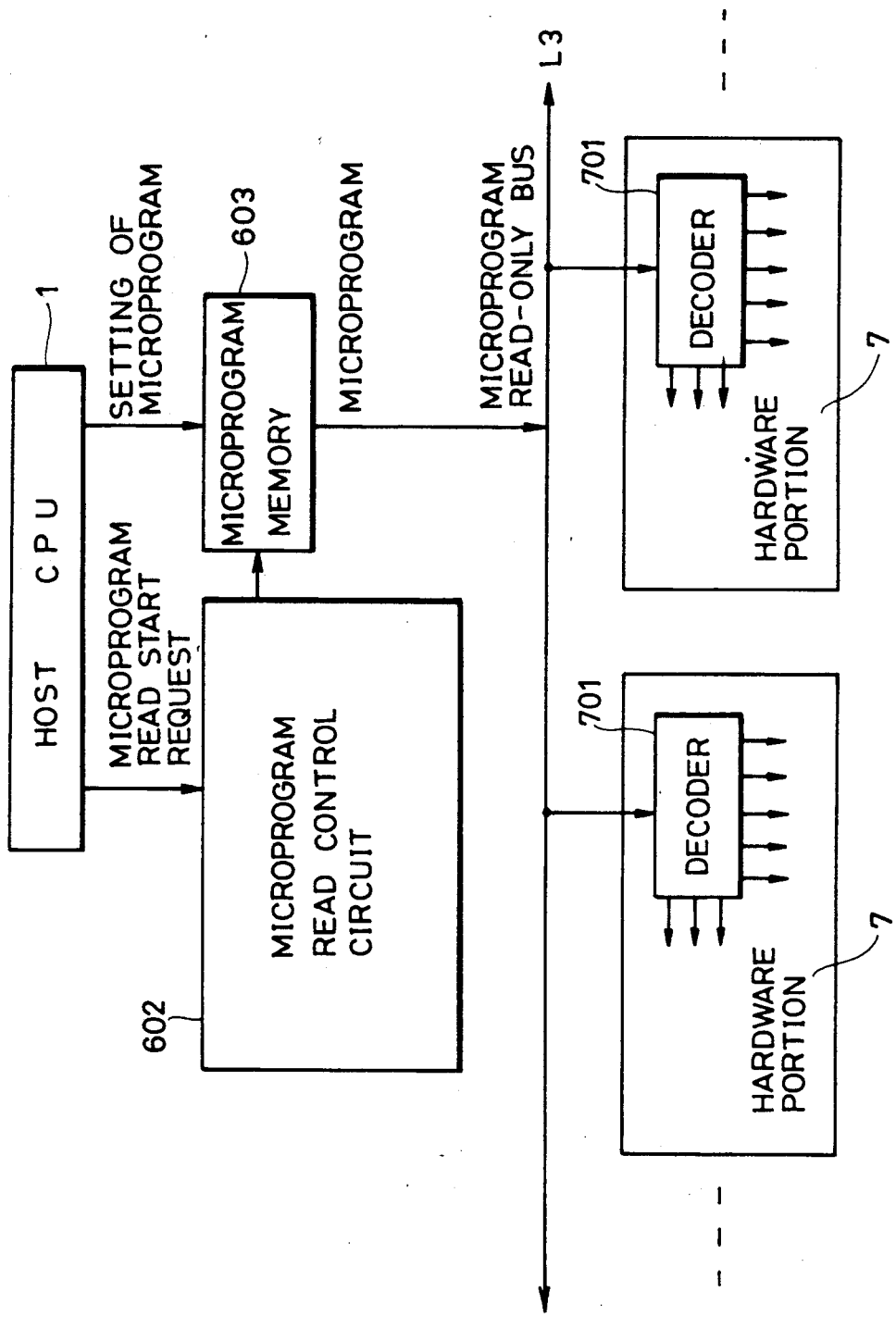
FIG. 3A is a block diagram for explaining a first feature of an embodiment of the present invention.

Referring first to FIG. 3A, the first feature of the embodiment will be described. FIG. 3A shows a portion related to the first feature of the embodiment described in detail afterwards. This portion related to the first feature comprises: a microprogram memory 603 for storing a microprogram formed by microinstructions of a plurality of steps, a hardware portion 7 which includes a circuit for performing at least any of image input processing, storage processing, operation processing and output processing; a microprogram read control circuit 602 for controlling reading of the microprogram memory 603; a host CPU 1 for setting a microprogram and issuing a microprogram reading start request; and a microprogram read-only bus L3. Circuits of the hardware portion 7 and the microprogram memory 603 are connected to the microprogram read-only bus L3. Each circuit of the hardware portion 7 comprises a decoder 701 for decoding a microinstruction provided thereto.

In the construction shown in FIG. 3A, the host CPU 1 sets a microprogram in the microprogram memory 603. In response to the microprogram reading start request issued from the host CPU 1, the microprogram read control circuit 602 operates so that the microprogram is read out from the microprogram memory 603 to the microprogram read-only bus L3. At this time, it is not control information already decoded for directly controlling the respective circuits of the hardware portion 7 or the microprogram read control circuit 602, but a microprogram not decoded, that is outputted to the microprogram read-only bus L3. Each circuit of the hardware portion 7 decodes, by means of the decoder 701, a necessary microinstruction from the microprogram read out on the bus L3 and prepares control information for itself. Then, operation of each circuit of the hardware portion 7 is controlled according to the content decoded by the related decoder 701.

Referring now to FIGS. 3B and 3C, the second feature of the embodiment of the present invention will be described. The portion related with the second feature comprises: the hardware portion 7 including a circuit for performing at least any of input processing, storage processing, operation processing and output processing of an image; a control circuit 6' for performing setting operation such as setting of operation conditions or an initial value for the hardware portion 7; and a timing signal generating circuit 605 for generating a timing signal for designating a period of processing of image data in the hardware portion 7 within a cycle of scanning of the image data for one frame.

In the construction shown in FIG. 3B, the hardware portion 7 performs processing of image data such as input processing, storage processing, operation processing and output processing of the image. Since this hardware portion 7 performs complicated functions by combining fundamental processing functions, each defined by regarding as a unit a cycle of scanning of image data for one frame, it is necessary to renew setting of operation conditions and initial values for each frame. Setting of operation conditions and setting of initial values in the hardware portion 7 are effected by the control circuit 6'. The timing signal generating circuit 605 generates a timing signal (for example, t0 in FIG. 3C) for designating a period of processing of image data in the hardware portion 7 within a cycle of scanning of image data for one frame. The control circuit 6' detects a vacant period other than the period of processing of image data in the hardware portion 7 within the cycle, thereby to perform, in this vacant period, an operation for setting desired conditions in the hardware portion 7 for a subsequent period of processing of image data.

Since the control circuit 6' starts the setting operation upon detection of a vacant period other than the period of processing of image data in the hardware portion 7, it is only necessary in practice for the control circuit 6' to determine an end of the period of processing of image data in the hardware portion 7, i.e. the end of one frame. Consequently, in the below described embodiment, a start point of the setting operation of the control circuit 6' is determined by using a timing signal t2 indicating the end point of one frame.

Figure 3D:
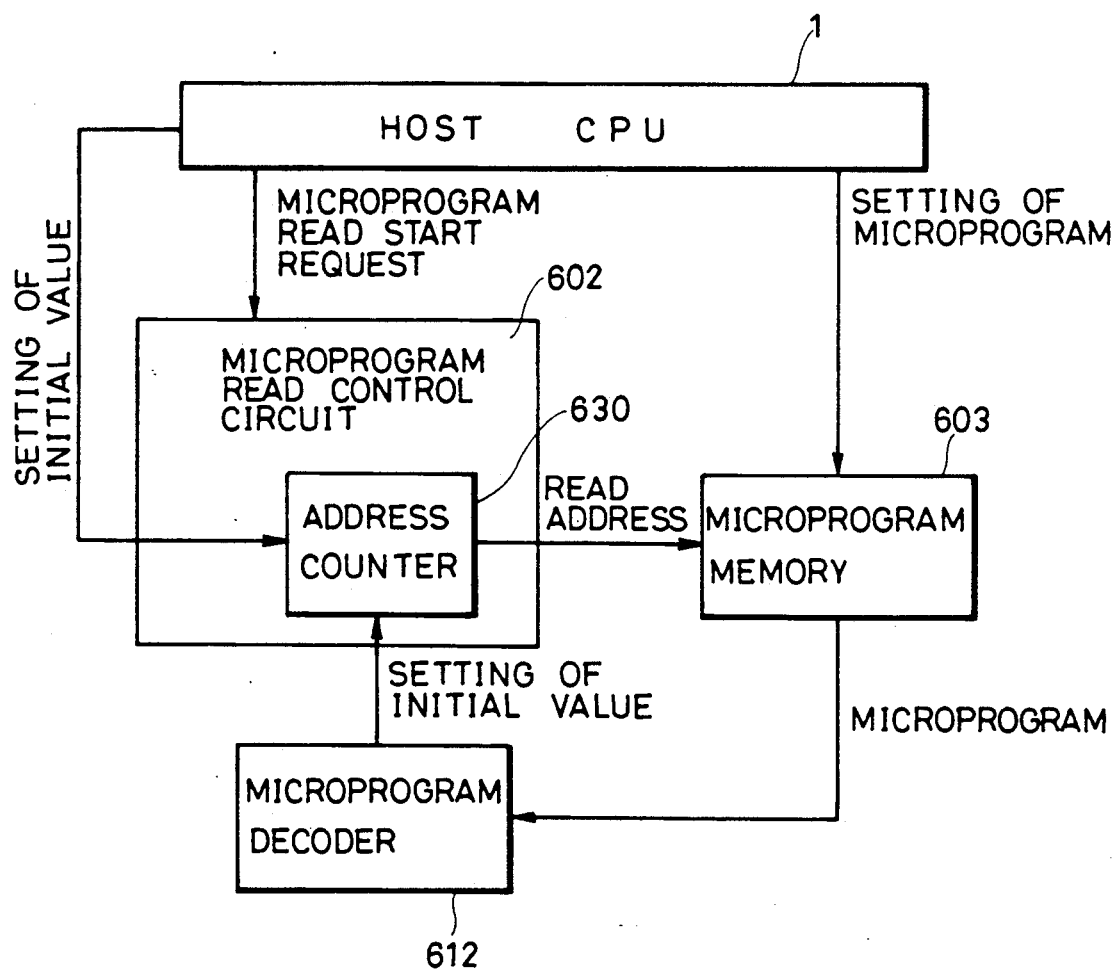
FIG. 3D is a block diagram for explaining a third feature of the embodiment.

Next, referring to FIG. 3D, the third feature of the embodiment of the present invention will be described. As shown in FIG. 3D, the portion related with the third feature comprises: the microprogram memory 603 for storing a microprogram formed by microinstructions of a plurality of steps; the microprogram read control circuit 602 for controlling reading of the microprogram memory 603; the host CPU 1 for setting a microprogram and issuing a microprogram reading start request; and a microprogram decoder 612 for forming control information for controlling operation of the microprogram read control circuit 602. The microprogram read control circuit 602 has an address counter 630 for supplying a read address to the microprogram memory 603. An initial value is set in the address counter 630 by the host CPU 1 or in response to control information obtained by decoding a microprogram by the microprogram decoder 612.

In the construction shown in FIG. 3D, the host CPU 1 sets a microprogram in the microprogram memory 603 and the microprogram read control circuit 602 operates upon receipt of the microprogram reading start request issued from the host CPU 1 to read a microprogram from the microprogram memory 603. The reading of the microprogram from the microprogram memory 603 is effected according to an address designated by the address counter 630. When the initial value is set in the address counter 630 by the host CPU 1, an address for starting reading is set. The count value of the address counter 630 is incremented from the set initial value, whereby the microprogram stored in the microprogram memory 603 is read out successively. If a microinstruction for setting the initial value of the address counter 630 is contained in the read-out microprogram, the initial value is set in the address counter 630 according to a decoded content of the microinstruction. The count value of the address counter 630 is incremented again from the set initial value, whereby the microprogram stored in the microprogram memory 603 is read out successively. Thus, the procedures for reading the microprogram can be controlled by the microinstruction contained in the microprogram itself, without software processing in the host CPU 1.

Now, the embodiment of the present invention will be described in detail.

(i) Overall Construction

Figure 1:
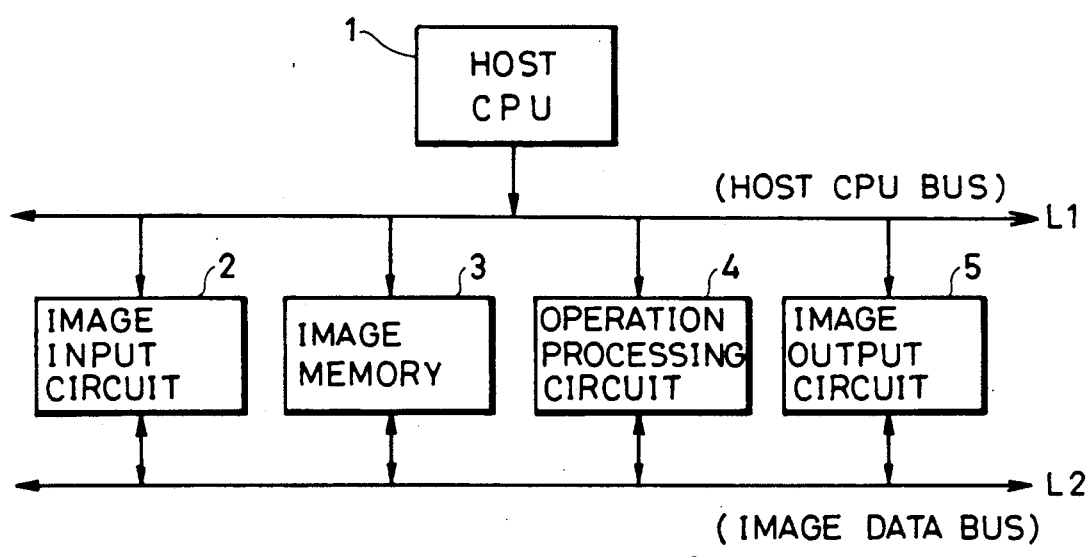
FIG. 1 is a block diagram showing an example of a conventional digital image processing apparatus.
Figure 2A:
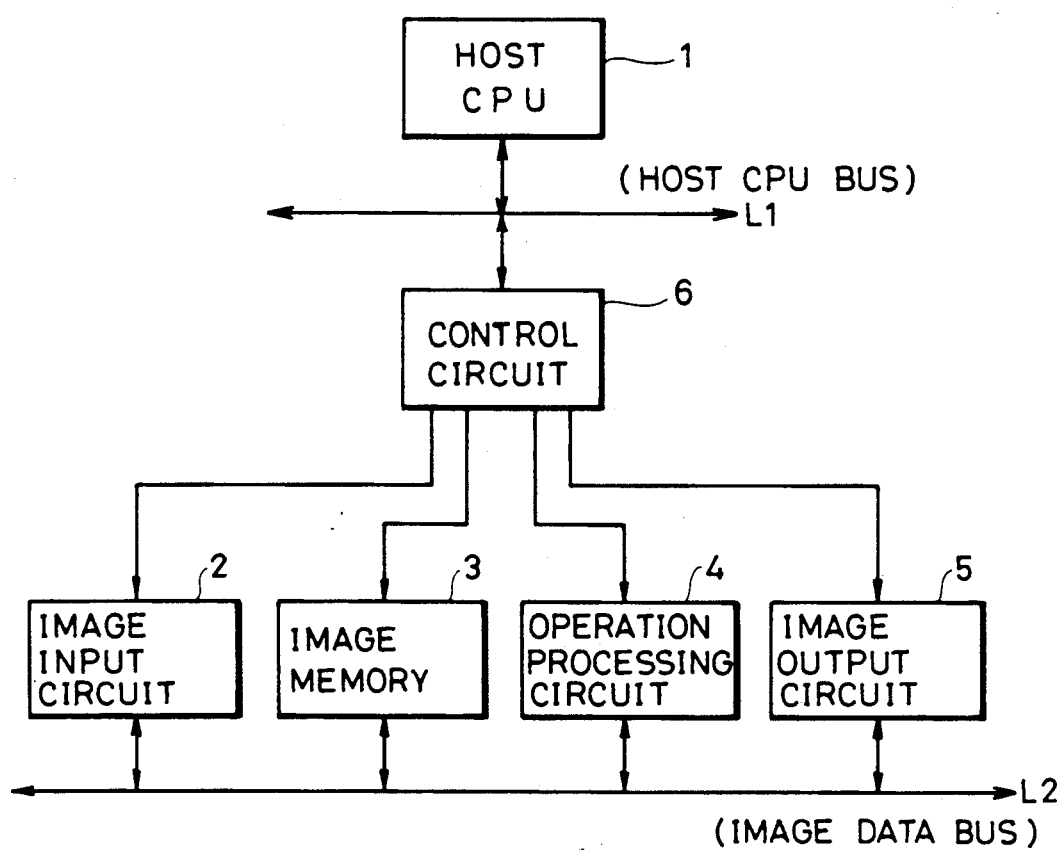
FIG. 2A is a block diagram showing another example of a conventional digital image processing apparatus.
Figure 2B:
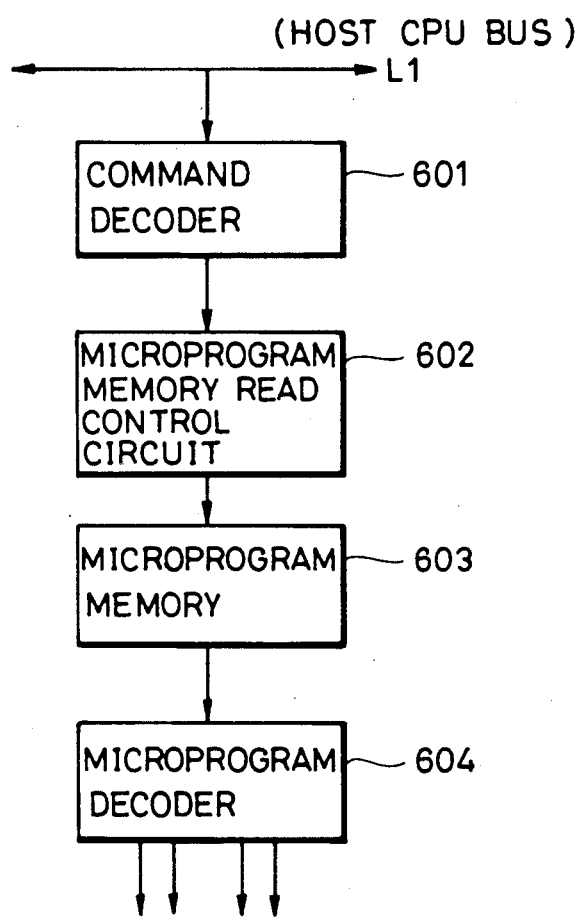
FIG. 2B is a block diagram showing an internal construction of a control circuit 6 shown in FIG. 2A.
Figure 4A:
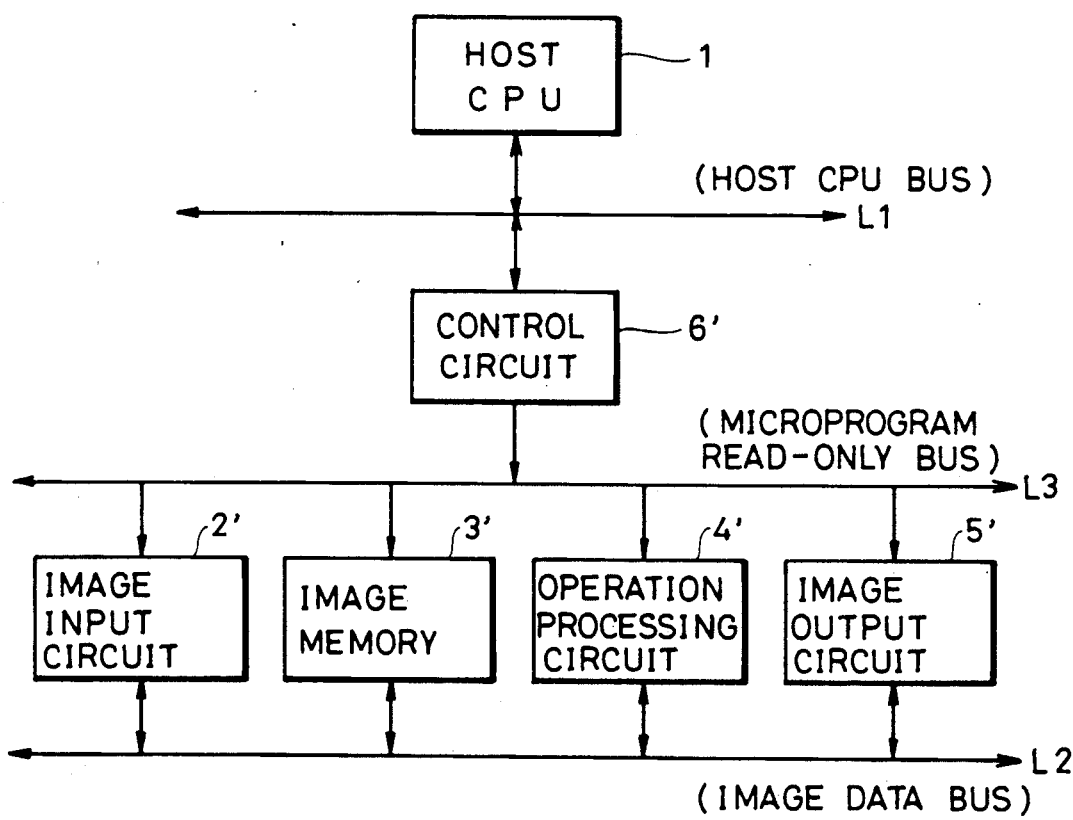
FIG. 4A is a block diagram showing a fundamental construction of a digital image processing apparatus of the embodiment.
Figure 4B:
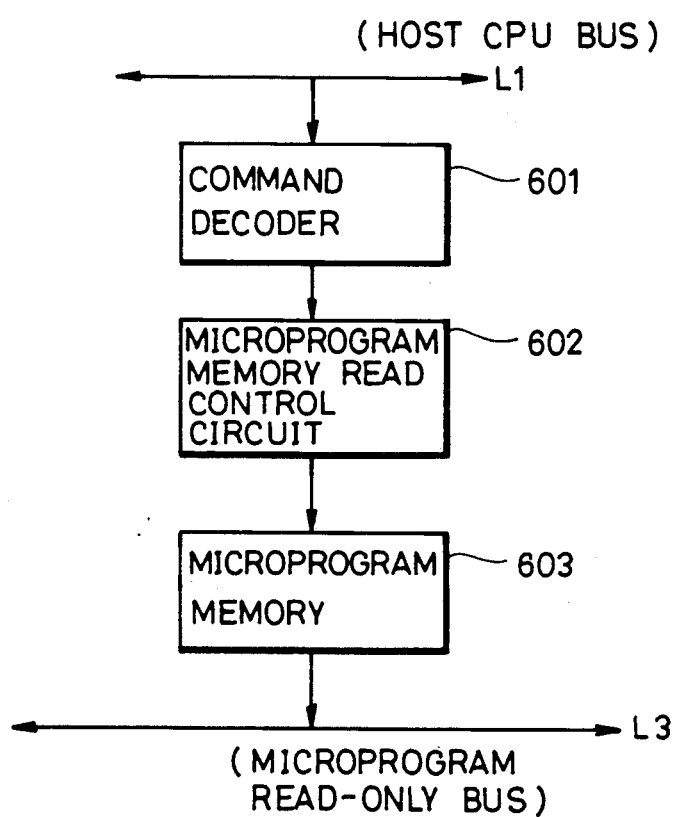
FIG. 4B is a block diagram showing an internal construction of a control circuit 6' shown in FIG. 4A.
Figure 4C:
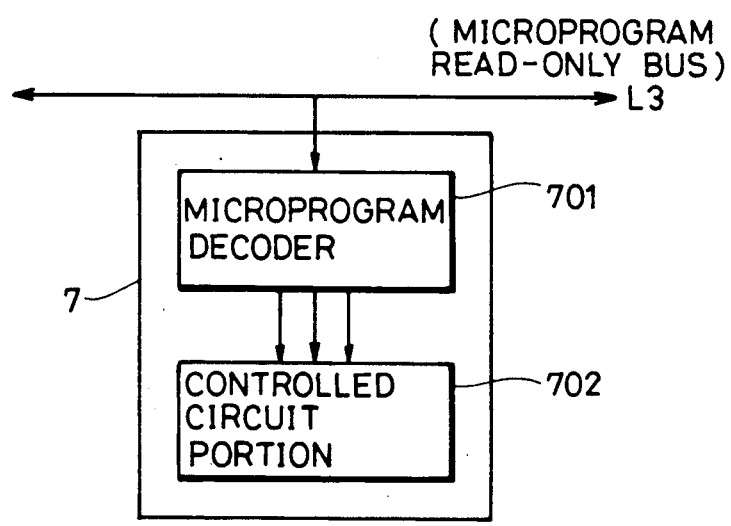
FIG. 4C is a block diagram showing an internal construction of a hardware portion to be controlled shown in FIG. 4A.

FIG. 4(A) is a block diagram of a digital image processing apparatus of an embodiment of the present invention. A host CPU 1, a host CPU bus L1 and an image data bus L2 in FIG. 4A are identical to those shown in FIG. 2A. The present embodiment is different from the apparatus in FIG. 2A in that a control circuit 6' and hardware circuits 2' to 5' to be controlled have a different construction and that a microprogram read-only bus L3 is provided. FIG. 4(B) shows a construction of the control circuit 6' of the present embodiment. The control circuit 6' of the present embodiment does not include such a microprogram decoder 604 for the entire hardware to be controlled as shown in FIG. 2(B) and a microprogram read out from a microprogram memory 603 is outputted to the microprogram read-only bus L3 as it is. FIG. 4(C) shows an internal construction of hardware to be controlled in the present embodiment. The hardware circuits 2' to 5' are connected to the control circuit 6' by means of the microprogram read-only bus L3 to receive a non-decoded raw microprogram. Out of the microprogram supplied to the hardware portion 7, only contents effective for the respective circuits are decoded by a microprogram decoder 701 to provide a control signal, whereby conditions necessary for a control portion 702 in each circuit are set.

With the above described construction, if modifications are made in the circuits of the hardware portion 7 or a new circuit is added to this portion 7, there is no need to modify the control circuit 6' or add a new circuit thereto and there is no need to change the microprogram read-only bus L3 (conventionally, such a read-only bus is not used). Accordingly, it is only necessary to modify construction of the microprogram decoder and the connection lines of the microprogram decoder 701 and the hardware portion on the side of the modified circuits.

(ii) Construction of the Control Circuit

Figure 5:
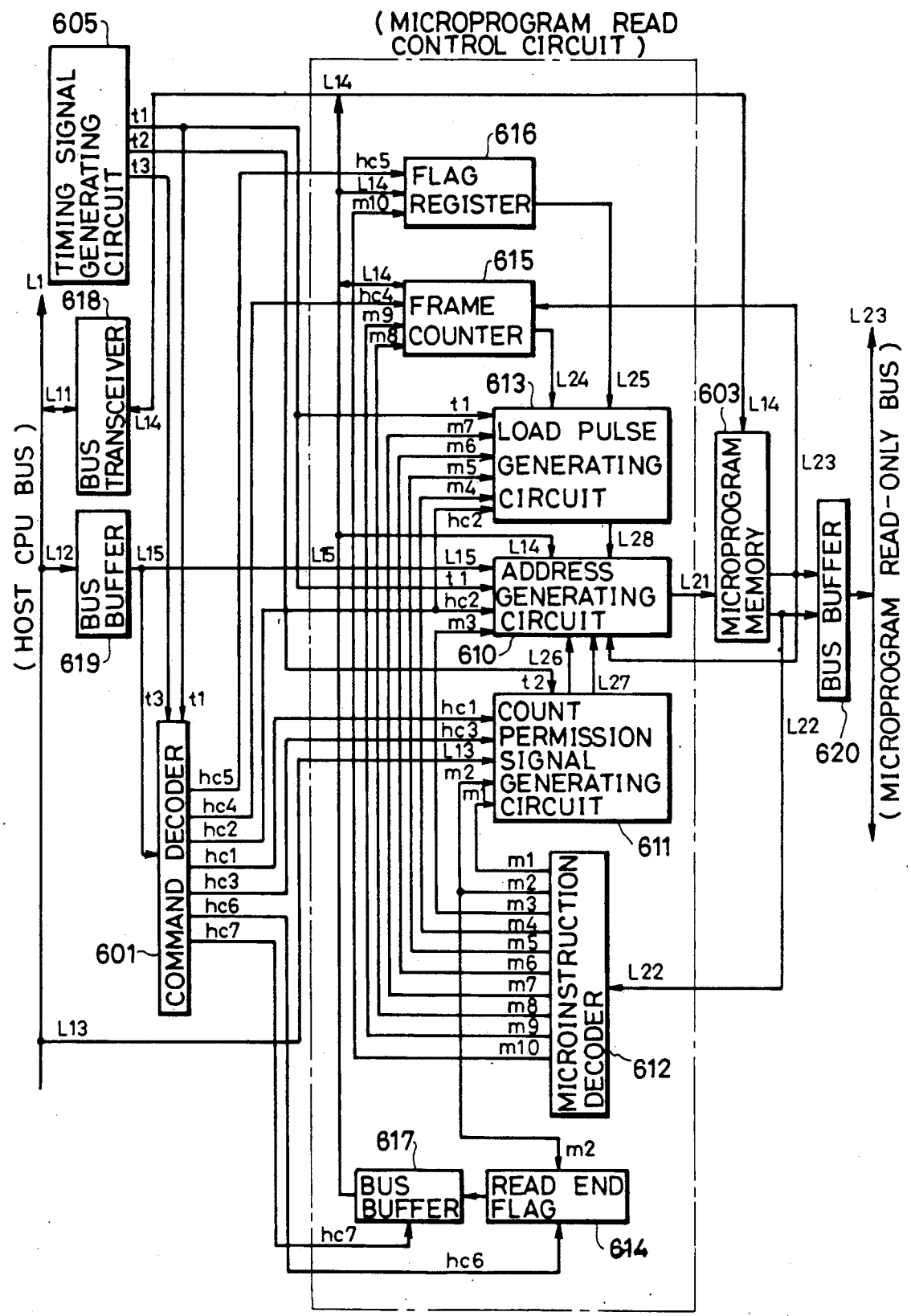
FIG. 5 is a block diagram showing a more detailed internal construction of the control circuit 6' shown in FIG. 4A.

FIG. 5 is a block diagram showing a detailed construction of the control circuit 6' of the embodiment of FIG. 4A. The control circuit 6' comprises: a command decoder 601; a microprogram read control circuit 602; the microprogram memory 603; a timing signal generating circuit 605; components 610 to 617 constituting the microprogram read control circuit 602; a bus transceiver 618 for interfacing a data line L11 of a host CPU bus L1 with the microprogram read control circuit 602 and the microprogram memory 603; a bus buffer 619 for interfacing a address line and a strobe signal line L12 of the host n CPU bus L1 with the microprogram read control circuit 602 and the command decoder 601; and a bus buffer 620 for outputting the data (microprogram) read out from the microprogram memory 603 to the microprogram read-only bus L3.

The microprogram read control circuit 602 comprises: a microprogram memory read address generating circuit 610, a count permission signal generating circuit 611, a microinstruction decoder 612, a load pulse generating circuit 613, a read end flag 614, a frame counter 615, a flag register 616, and a bus buffer 617 for outputting a state of the read end flag 614 to the host CPU bus L1 through the bus transceiver 618.

The command decoder 601 outputs seven decoder output signals hc1 to hc7 when it decodes commands corresponding thereto respectively. More specifically, the signal hc1 is outputted when a RUN command is decoded; the signal hc2 is outputted when an SSA command (Set Start Address command) is decoded; the signal hc3 is outputted when an END command is decoded; the signal hc4 is outputted when an SFC command (Set Frame Counter command) is decoded; the signal hc5 is outputted when an SFR command (Set Flag Register command) is decoded; the signal hc6 is outputted when an REF command (Reset End Flag command) is decoded; and the signal hc7 is outputted when an RD.EF command (ReaD. End Flag command) is decoded.

The microinstruction decoder 612 outputs ten decoder output signals m1 to m10 when it decodes instructions corresponding thereto respectively. More specifically, the signal m1 is outputted when an EOFR instruction (End Of FRame instruction) is decoded; the signal m2 is outputted when an EXIT instruction is decoded; the signal m3 is outputted when an S.RAR instruction (Set. Return Address Register instruction) is decoded; the signal m4 is outputted when an RET instruction is decoded; the signal m5 is outputted when a JUMP instruction is decoded; the signal m6 is outputted when a JPC.Z instruction (JumP Condition. Zero instruction) is decoded; the signal m7 is outputted when a JPC.F instruction (JumP Condition. Flag instruction) is decoded; the signal m8 is outputted when a DOWN.FC instruction (DOWN Frame Counter instruction) is decoded; the signal m9 is outputted when an S.FRC instruction (Set. FRame Counter instruction) is decoded; and the signal m10 is outputted when an R.FLG instruction (Reset FLaG instruction) is decoded.

Although detailed contents of the respective commands and instructions will be described afterwards, a "command" in this specification generally means a host command issued by the host CPU 1 to the control circuit 6' and an "instruction" in this specification generally means a microinstruction contained in the microprogram and supplied to the control circuit 6'.

FIG. 5 further shows a signal line L13 of an initial reset signal in the host CPU bus L1, a host CPU data bus L14 in the control circuit 6', a host CPU address bus L15 in the control circuit 6', and a signal line L21 for a microprogram read address outputted by the microprogram memory read address generating circuit 610. There are further provided signal lines L22 and L23 for data read out from the microprogram memory 603. The data of those two lines L22 and L23 constitute a microinstruction, the data of the signal line L22 being an address portion of the microinstruction and the data of the signal line L23 being a data portion of the microinstruction. A signal line L24 is a line for a signal outputted when a count value of the frame counter 615 becomes 0; a signal line L25 is a line for a signal outputted when the flag register 616 is set; a signal line L26 is a line for a count permission signal supplied by the count permission signal generating circuit 611 to the microprogram memory read address generating circuit 610; a signal line L27 is a line for an address selection signal supplied by the count permission signal generating circuit 611 to the microprogram memory read address generating circuit 610; and a signal line L28 is a line for a load pulse signal supplied by the load pulse generating circuit 613 to the microprogram memory read address generating circuit 610.

In the following description, the reference characters L13 to L28 are also used to indicate signals or data on those lines, for example, a signal L13 or data L14. Similarly, the reference characters hc1 to hc7 for indicating the decoder output signals of the command decoder 601 are also used to indicate the host commands and the reference characters m1 to m10 for indicating the decoder output signals of the microinstruction decoder 612 are also used to indicate the microinstructions.

The timing signal generating circuit 605 generates timing signals t1, t2 and t3, t1 being a clock pulse forming a fundamental period of a unit operation of the control circuit 6', t2 being a timing signal for indicating an end of a scanning period for one frame, and t3 being a timing signal corresponding to a period half of the fundamental period of t1.

Figure 6:
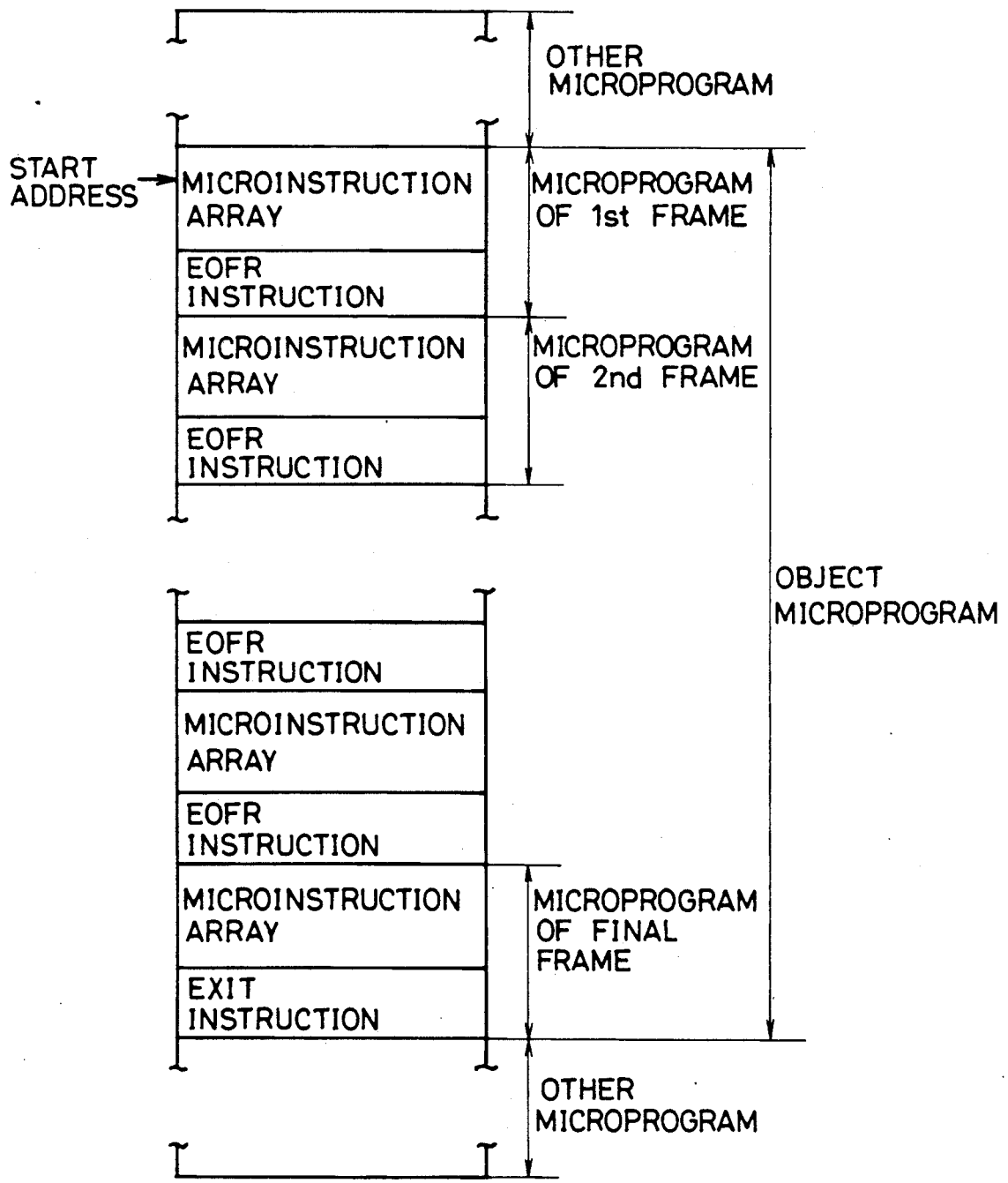
FIG. 6 is an illustration showing an example of contents stored in a microprogram memory 603 in FIG. 4B.

FIG. 6 shows an example of the stored contents of the microprogram memory 603. A plurality of microprograms can be resident in the microprogram memory 603 and the resident microprograms are distinguished from one another by a first address of each microprogram. Each microinstruction is composed of an address portion and a data portion. The address portion serves to distinguish the respective hardware circuits 2' to 5' connected to the microprogram read-only bus L3 and to designate the portion for condition setting in each circuit or to perform prescribed operation in each circuit. Data of the data portion serves as data supplied to the condition setting portion designated by the address portion or data utilized for the operation designated by the address portion. The address portion serves not only to designate the hardware circuits 2' to 5' connected to the microprogram read-only bus L3 but also to designate the control circuit 6'. More specifically, the microinstructions read out from the microprogram memory 603 are outputted not only to the microprogram read-only bus L3 through the bus buffer 620 but also to the control circuit 6'.

The address portion of the microinstructions outputted to the control circuit 6' are supplied to the microinstruction decoder 612 through the signal line L22, where the microinstructions to the control circuit 6' are decoded and the decoder output signals m1 to m10 are supplied to the respective portions in the control circuit 6'. The data portion of the microinstruction is supplied to the microprogram memory read address generating circuit 610 and the frame counter 615 through the signal line L23. Reading of the microprogram from the microprogram memory 603 is started when the host CPU 1 issues the RUN command after providing, to the control circuit 6', the SSA command (the host command for setting a start address) and the first address of the related microprogram on the microprogram memory 603, as will be described in detail afterwards. The host CPU 1 is capable of rewriting the content of the microprogram memory 603 before it issues the SSA command or the RUN command. Thus, the data portion of each microinstruction can be rewritten as required and the already stored microprogram can be adapted precisely t desired processing.

Detailed constructions of the main components of the microprogram read control circuit 602, i.e., the microprogram memory read address generating circuit 610, the count permission signal generating 611 and the load pulse generating circuit 613 will be described in the following.

(iii) Construction of the Microprogram Memory Read Address Generating Circuit 610

Figure 7:
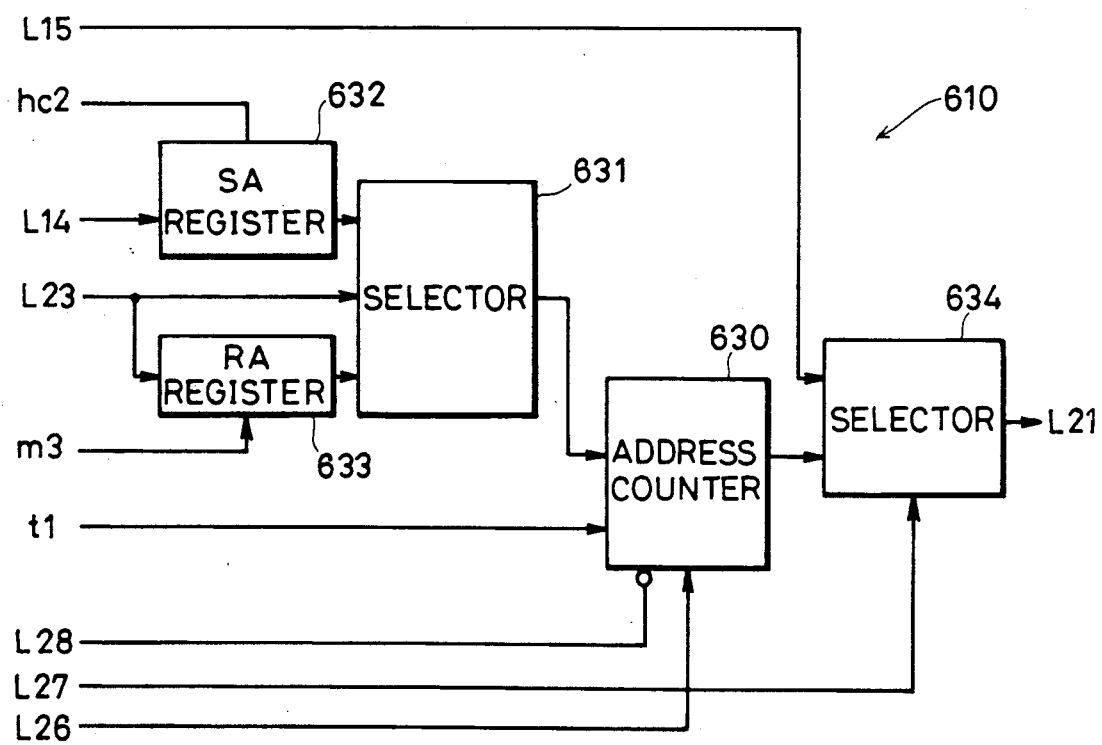
FIG. 7 is a block diagram showing a detailed construction of a microprogram memory read address generating circuit 610 in FIG. 5.

FIG. 7 is a block diagram showing detailed construction of the microprogram memory read address generating circuit 610. An address counter 630 counts upward responsive to the timing signal t1 generated by the timing signal generating circuit 605 and it operates only in a period in which the count permission signal L26 generated by the count permission signal generating circuit 611 is effective. A selector 631 selects any one of three start addresses supplied to the address counter 630. When the count permission signal L26 is effective and the timing signal t1 is inputted to the address generating circuit 610 during the inputting of the load pulse L28 generated by the load pulse generating circuit 613, the start address selected by the selector 631 is set in the address counter 630. A start address register 632 sets, as a start address, the data L14 supplied from the host CPU 1 responsive to the SSA command hc2. A return address register 633 sets a return address value to be utilized for the RET instruction supplied by the S.RAR instruction m3 (the RET instruction being a return instruction for return from a subroutine to a main routine in the microprogram, as described in detail afterwards). The three start addresses inputted to the selector 631 are the content of the start address register 632, the content of the return address register 633 and the data portion L23 of a microinstruction.

The data portion L23 of the microinstruction inputted to the selector 631 is used as an address designating a destination position on the microprogram memory 603 when an address designating the currently read-out microprogram is caused to jump. Microinstructions for jumping are the JUMP instruction for jumping to an address designated by the data portion without condition, the JPC.Z instruction and the JPC.F instruction for jumping with condition. The jumping condition of the JPC.Z instruction is that the signal L24 indicating 0 as the count value of the frame counter 615 is effective. The jumping condition of the JPC.F instruction is that the signal L25 indicating a set state of the flag register 616 is effective.

When the RET instruction is being executed, a set value of the return address counter 633 is selected by the selector 631 and the load pulse L28 is supplied to the address counter 630. Thus, the same operation as in the case of a microinstruction for jumping is performed.

A selector 634 receives two inputs, i.e., the address L15 from the host CPU 1 and the count value of the address counter 630. The selector 634 selects one of the two inputs in response to the address selection signal L27 outputted by the count permission signal generating circuit 611 and outputs the address L21 to the microprogram memory 603. In the case of reading a microprogram for image processing, a count value of the address counter 630 is selected by the instruction of the address selection signal L27. In other cases, the address L15 supplied from the host CPU 1 is selected to enable the host CPU 1 to access the microprogram memory 603.

(iv) Construction of the Count Permission Signal Generating Circuit 611

Figure 8:
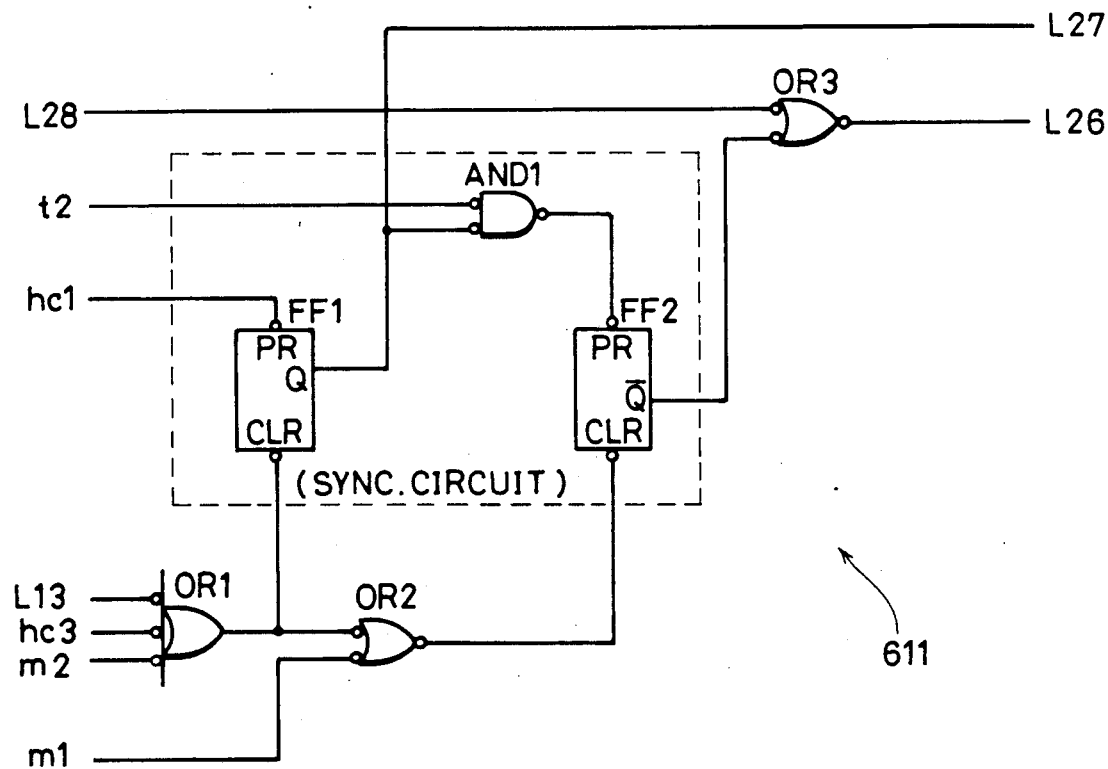
FIG. 8 is a block diagram showing a detailed construction of a count permission signal generating circuit 611 in FIG. 5.

FIG. 8 is a block diagram showing construction of the count permission signal generating circuit 611. As described above, reading of the microprogram is started by the RUN command issued from the host CPU 1 to the control circuit 6'. More specifically stated, the reading is effected by the count permission signal generating circuit 611. When the host CPU 1 issues the RUN command, the RUN command is decoded by the command decoder 601 and the decoder output signal hc1 is inputted to a preset input (referred to hereinafter as the PR input) of a flip-flop FF1 to set the flip-flop FF1. An output Q of the flip-flop FF1 is supplied to the microprogram memory read address generating circuit 610 as the address selection signal L27. At the same time, the output Q of the flip-flop FF1 is gated with the timing signal t2 indicating an end of the scanning period of one frame by an AND gate AND1 and used as a PR input signal for a flip-flop FF2. An output $\overline{Q}$ of the flip-flop FF2 is inverted by an OR gate OR3 to be the address count permission signal L26, which is inputted to the microprogram memory read address generating circuit 610. The address count permission signal L26 is outputted by the OR gate OR3 to permit counting of the address counter 630 even if the load pulse L2 generated by the load pulse generating circuit 613 is effective.

Thus, the circuit 611 sets the flip-flop FF2 in synchronism with the timing signal t2 after the processing start request (the RUN command) issued by the host CPU 1 is temporarily identified by the flip-flop FF1 independent of the operation timing in the controlled hardware circuits, whereby the reading of the microprogram is effected according to the operation timing in the controlled hardware circuits. When the address count permission signal L26 becomes effective, the address counter 630 in the microprogram memory read address generating circuit 610 is permitted to count. Thus, the counter 630 starts counting addresses in response to the timing signal t1 to supply read-out addresses to the microprogram memory 603, whereby the microprogram is read out. When the microinstruction decoder 612 detects the EOFR instruction from the microprogram which is being read, the effective decoder output signal ml is inputted to a clear input (referred to hereinafter as the CLR input) of the flip-flop FF2 through the OR gate OR2. Consequently, the flip-flop FF2 is reset and the address count permission signal L26 becomes ineffective so as to stop the counting of addresses. At the same time, the output data (microinstruction) of the microprogram memory 603 is fixed as the EOFR instruction.

In the controlled hardware circuits, microinstructions necessary for the respective circuits are decoded out of the read-out microinstructions, thereby to set predetermined operation conditions. When the timing signal t2 is inputted again in the state in which counting of addresses is stopped, the PR input of the flip-flop FF2 becomes effective to set the flip-flop FF2. As a result, the address count permission signal L26 becomes effective again to restart counting of addresses.

When the microinstruction decoder 612 detects the EXIT instruction from the read-out microprogram, the flip-flops FF1 and FF2 are reset by the effective decoder output signal m2. As a result, the address count permission signal L26 becomes ineffective and the address selection signal L27 is inverted. After that, the flip-flop FF2 is no longer set even by a newly input timing signal t2.

The same operation as the above described operation by the EXIT instruction can be also performed by the initial reset signal L13 supplied from the host CPU bus L1 or the END command hc3 supplied from the host CPU 1. The initial reset signal L13 serves to set an initial state of the control circuit 6' before the host CPU 1 issues the RUN command, and the END command hc3 serves to forcedly relieve the microprogram from a disorder caused by some accident.

Thus, reading of the microprogram is started from a leading edge of a new frame after the host CPU 1 issues the RUN command, and the reading is temporarily stopped in response to the EOFR instruction and then restarted from a leading edge of the subsequent frame. Then, the reading is terminated in response to the EXIT instruction.

When the EXIT instruction is read out from the microprogram, the reading of the microprogram is terminated and the read end flag 614 is set by the decoder output signal m2 of the EXIT instruction from the microinstruction decoder 612. A state of the read end flag 614 is detected by the host CPU 1 through the bus transceiver 618 when the RD.EF command (the host command for checking a state of the read end flag) from the host CPU 1 is decoded by the command decoder 601 and the decoder output signal hc7 becomes effective to bring the bus buffer 617 into an output state. By checking the state of the read end flag 614, the host CPU 1 determines whether the control circuit 6' is performing processing at present or is in a state ready for receiving the processing start request. More specifically, if the read end flag 614 is set before the host CPU 1 issues the processing start request, the control circuit 6' is enabled to receive the processing start request. If the flag 614 is reset, the control circuit 6' is not enabled to receive the processing start request and the host CPU 1 waits for setting of the read end flag 614. If the read end flag 614 is set and the host CPU 1 issues the processing start request, it is necessary to issue the REF command (the host command for resetting the read end flag) before execution of the RUN command and to reset the read end flag 614 in response to the decoder output signal hc6 of the REF command.

Figure 9:
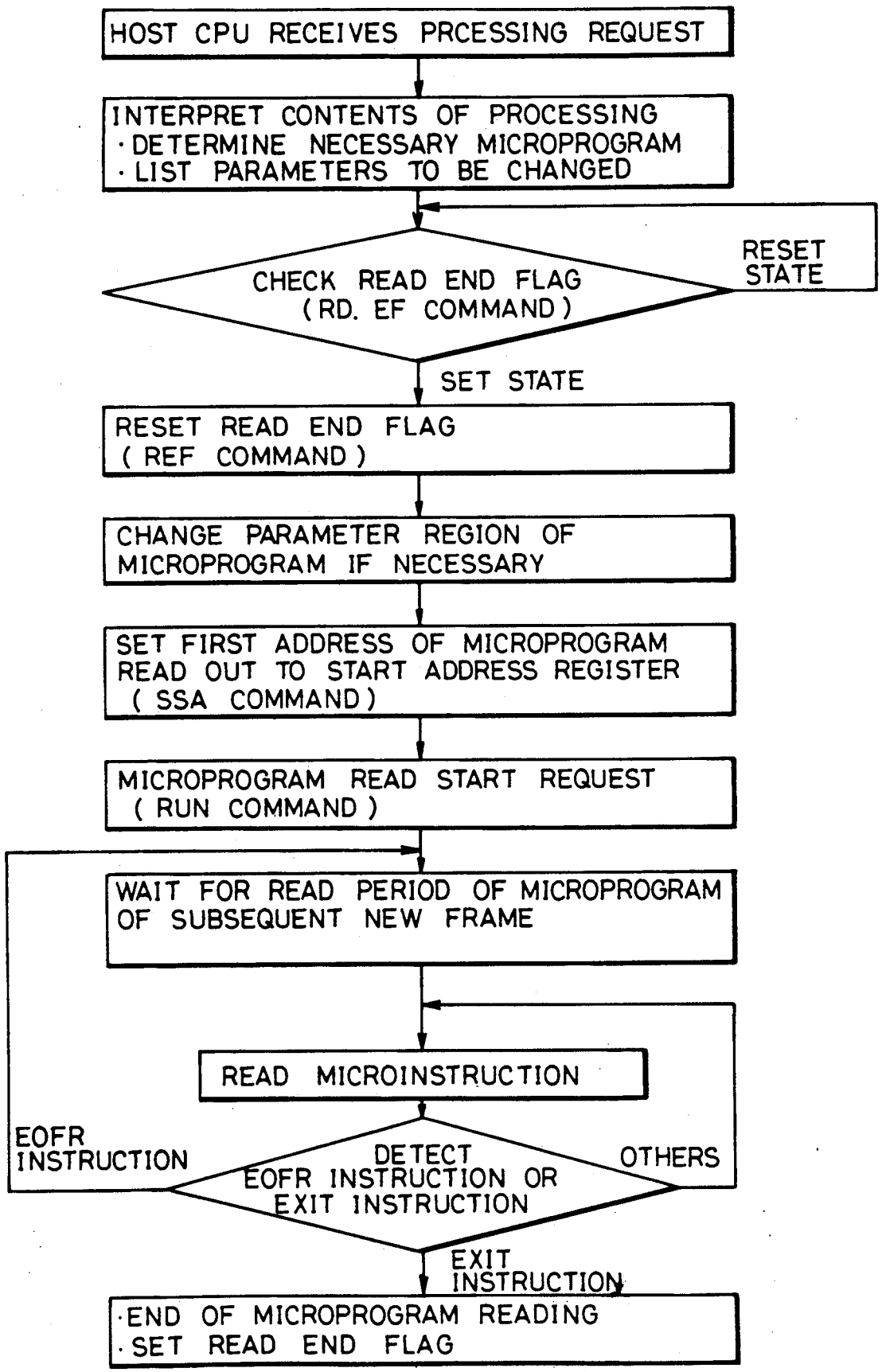
FIG. 9 is a flow chart showing procedures in a host CPU 1 from receipt of a processing request to an end of reading of a microprogram.

FIG. 9 is a flow chart showing procedures from receipt of the processing request by the host CPU 1 to the end of reading of the microprogram.

(v) Construction of the Load Pulse Generating Circuit 613

Figure 10:
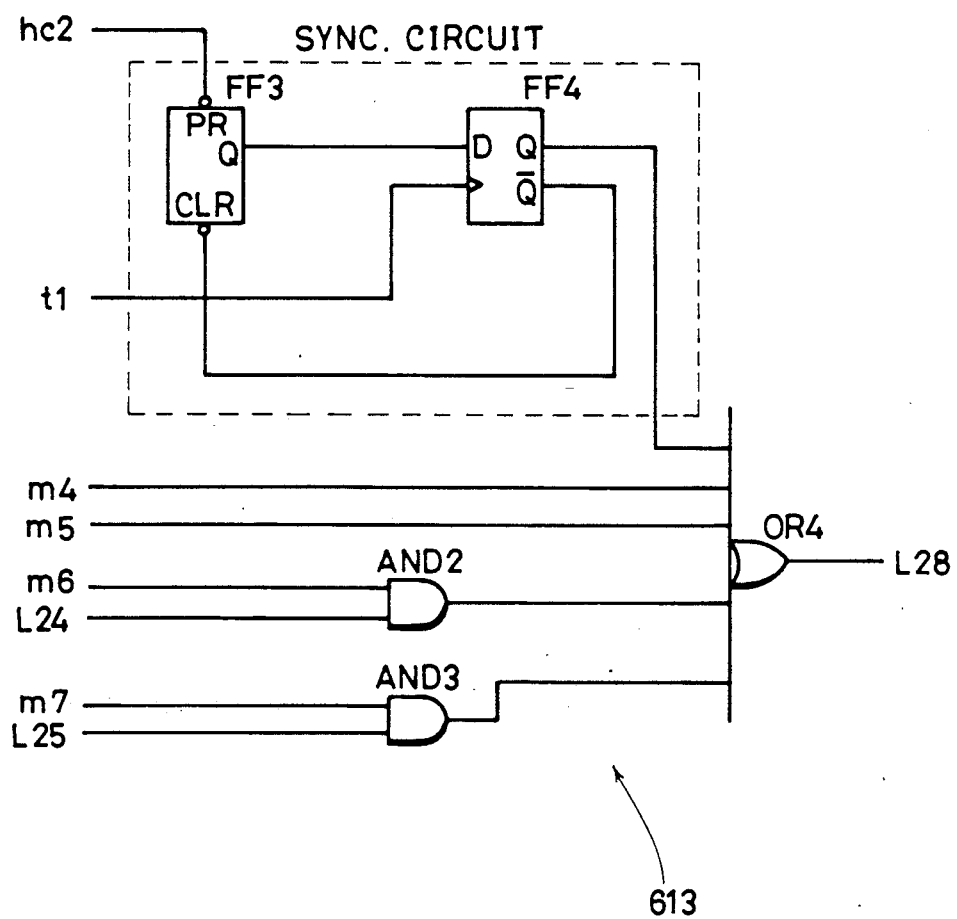
FIG. 10 is a block diagram showing a detailed construction of a load pulse generating circuit 613 shown in FIG. 5.

FIG. 10 is a block diagram showing construction of the load pulse generating circuit 613. This load pulse generating circuit 613 generates the load pulse L28 necessary for setting, in the address counter 630 of the microprogram memory read address generating circuit 610, a destination address for jump or return shown by the data portion of each microprogram when the microinstruction decoder 612 decodes the microinstructions for jump, i.e., the JUMP instruction, the JPC.Z instruction and the JPC.F instruction, as well as the RET instruction for return from a subroutine. Referring to FIG. 10, the decoder output signals m4, m5, m6 and m7 are outputted when the microinstruction decoder 612 decodes the RET instruction, the JUMP instruction, the JPC.Z instruction and the JPC.F instruction, respectively. The condition signal L24 is outputted when the count value of the frame counter 615 is 0, and the condition signal L25 is outputted when the flag register 616 is set. Logical product between the signal L24 and the decoder output signal m6 and logical product between the signal L25 and the decoder output signal m7 are obtained in the AND gates AND2 and AND3, respectively, to determine thereby whether the conditions in the jump microinstructions with condition are satisfied. The decoder output signal hc2 is outputted by the command decoder 601 when the host CPU 1 issues the SSA command. However, this decoder output signal hc2 is not synchronizing with the clock input (the timing signal t1) to the address counter 630 and therefore it cannot be utilized as the load pulse for the address counter 630. For this reason, in the circuit 613, the flip-flop FF3 is set by the decoder output signal hc2 of the SSA command and the set state of the flip-flop FF3 is detected by triggering the flip-flop FF4 by the timing signal t1 which is also used as the clock signal of the address counter 630, whereby the output Q of the flip-flop FF4 can be utilized as the load pulse. By resetting the flip-flop FF3 in response to the output $\overline{Q}$ of the flip-flop FF4, the state of the flip-flop FF4 is inverted in response to the subsequent timing signal t1, so that a width of the load pulse outputted by the SSA command can correspond to a period of the timing signal t1. Thus, the start address can be set by the SSA command generated independent of the clock input of the address counter 630. The output Q of the flip-flop FF4, the decoder output signals m4 and m5, and the outputs of the AND gates AND2 and AND3 are received together by the OR gate OR4 so as to be inputted as the load pulse L28 to the microprogram memory read address generating circuit 610.

Now, methods of utilization of the flag register 616, the frame counter 615 and subroutines useful for microprogramming will be described.

(vi) Method of Utilization of the Flag Register 616

A state of the flag register 616 is set when the SFR command (the host command for setting a state of the flag register) from the host CPU 1 is decoded by the command decoder 601 or when the R.FLG instruction (the microinstruction for resetting the flag) out of the microinstructions is decoded by the microinstruction decoder 612. The flag register 616 is a D-flip-flop having a clear input and it is triggered by the decoder output signal hc5 of the SFR command so that a state of the flag register 616 is set by a signal of a specified bit (for example, the least significant bit) in the data signal L14 from the host CPU bus L1 provided at that time. For example, if the least significant bit is 0, the flag register 616 is in a reset state and if the least significant bit is 1, it is in a set state. The clear input is connected to the decoder output signal m10 of the R.FLG instruction, so that the flag register 616 can be reset.

Thus, the flag register 616 can be set by the command from the host CPU 1 and reset by the microinstruction and it can be utilized as the condition of the jumping instruction JPC.F with condition out of the microinstructions. In consequence, it becomes possible to form a loop in the microprogram using the JPC.F instruction as a branch point, to exit from the loop by control of the host CPU 1 and to transfer control to another region of the microprogram. To utilize again the JPC.F instruction in the microprogram, it is only necessary to reset the flag register 616 by the R.FLG instruction.

(vii) Method of Utilization of the Frame Counter 615

The frame counter 615 is a down-counter capable of setting an initial value. Setting of the initial value is effected by the SFC command (the host command for setting the initial value of the frame counter) from the host CPU 1 or the S.FRC instruction (the microinstruction for setting the initial value of the frame counter) of the microprogram. When the SFC command from the host CPU 1 is decoded by the command decoder 601, the decoder output signal hc4 is outputted and the data L14 from the host CPU bus L1 is set in the frame counter 615. When the S.FRC instruction is decoded by the microinstruction decoder 612, the decoder output signal m9 is outputted and the data portion L23 of the microinstruction is set in the frame counter 615. When the DOWN.FC instruction (the microinstruction for counting down the frame counter) in the microprogram is decoded by the microinstruction decoder 612, the decoder output signal m8 is outputted and the frame counter 615 counts downward. When the count value of the frame counter 615 becomes 0 as a result of the downward counting, the count value is transmitted to the load pulse generating circuit 613 through the signal line L24. As described above, the signal line L24 can be utilized for the condition of the jump microinstruction (JPC.Z instruction) with condition. Accordingly if the initial value is set in advance in the frame counter 615 by the SFC command or the S.FRC instruction and a loop is formed in the microprogram by using the JPC.Z instruction as a branch point to insert the DOWN.FC instruction in this loop, it becomes possible to read out the same microprogram by a prescribed number of times according to the initial value. Particularly, if the EOFR instruction (the instruction for temporarily stopping reading of the microinstruction in the frame concerned) is inserted into the loop together with the DOWN.FC instruction, processing of a period of one frame can be performed for one loop. Accordingly, as the initial value in the frame counter 615, the number of processing operations for one frame is set. By utilizing this, it becomes possible to repeat the same processing for the designated number of frames. This technique can be effectively utilized for example for the case in which image data having a length of 8 bits containing noise at random temporally is inputted and integrated for 256 frames and most significant byte of the image data having a length of 16 bits is finally obtained as image data of 8 bits with reduced noise. It is well-known technique that by integration for 256 times, the 8-bit data is carried eight times to become 16-bit data and that the most significant byte thereof becomes image data having an improved S/N since noise in those bytes is integrated.

(viii) Methods for Subroutine Call and Return

Figure 11:
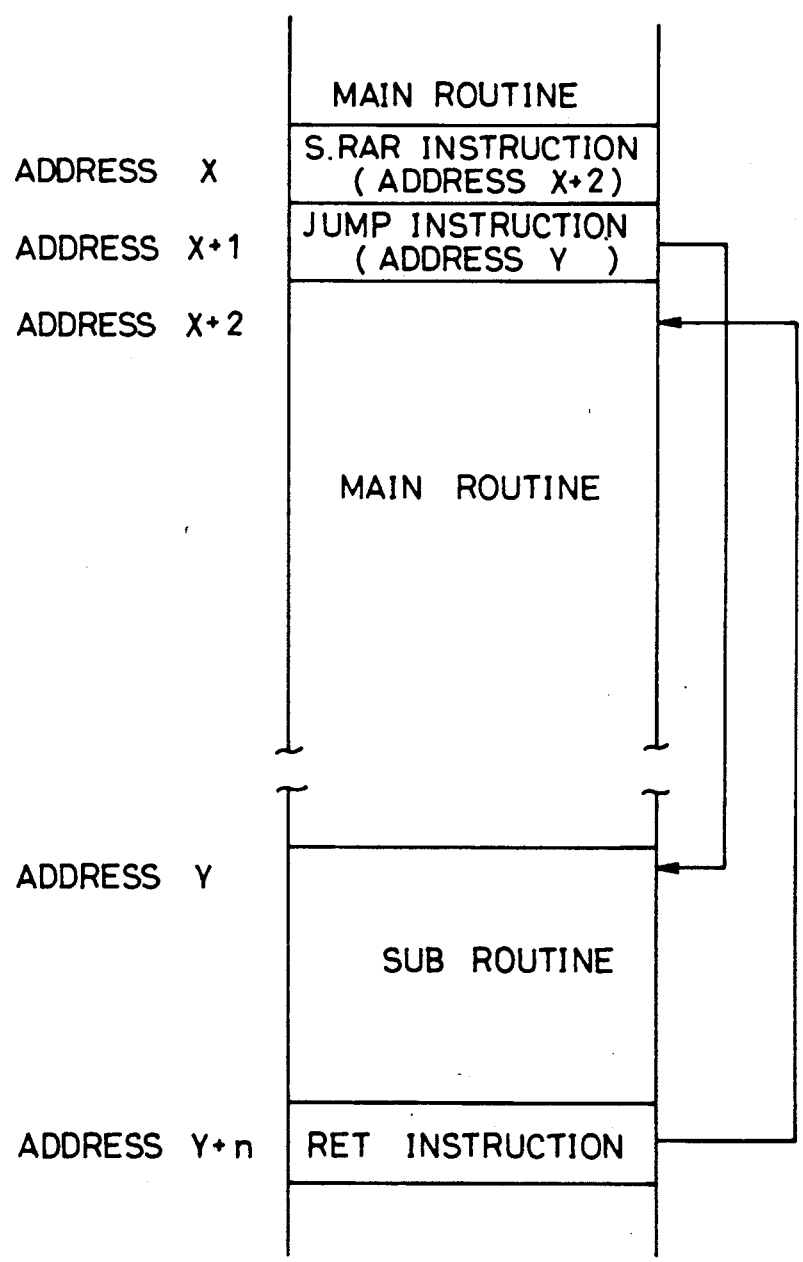
FIG. 11 is an illustration for explaining a subroutine call and a return from the subroutine to a main routine in a microprogram of the embodiment.

FIG. 11 is an illustration for explaining methods for subroutine call in the microprogram and return from the subroutine to the main routine in accordance with the present embodiment. When the RET instruction is executed in a state in which the return address is preset by the S.RAR instruction in the return address register 633 in the microprogram memory read address generating circuit 610 as described above, it becomes possible to exit from the subroutine since the return address in the return address register 633 is set in the address counter 630. As a result, as shown in FIG. 11, by setting, in the return address register 633, a value (X+2) as a return address from the subroutine by the S.RAR instruction located in the address X, the program can jump to the subroutine in an address Y by the JUMP instruction located in an address (X+1) to transfer control to the subroutine, and can return to the address (X+2) next to the address (X+1) related to the subroutine, by the RET instruction which is the final instruction of the subroutine. More specifically, a subroutine call instruction is formed by combination of the successive S.RAR instruction and JUMP instruction. Thus, the present embodiment makes it possible to execute the subroutine call in microprogramming in addition to the simple non-conditional jumping instructions and the conditional jumping instructions.

As described above, the embodiment of the present invention has an advantage that microprograms located discontinuously in the microprogram memory can be connected if a non-conditional jumping instruction is provided as a microinstruction for controlling procedures for reading the microprograms.

Another advantage is that it becomes possible to exit from an infinite loop by means of external control if a jumping instruction with condition dependent on a state of an externally controllable flag register is provided.

A further advantage is that it becomes possible to execute the same processing for a plural number of times if a count instruction for operating the counter and a jumping instruction with condition dependent on the value of the counter are provided.

A still further advantage is that if a subroutine call instruction and a return instruction from the subroutine are provided to set subroutines for frequently utilized control programs, a storage capacity of the microprogram memory can be decreased and microprogramming can be effected efficiently.

Although the present invention has been described and illustrate in detail, it is clearly understood that the same is by way of illustration and example only and is not to be taken by way of limitation, the spirit and scope of the present invention being limited only by the terms of the appended claims.

What is claimed is:

1. A digital image processing apparatus comprising:
   a microprogram memory for storing a microprogram formed by microinstructions,
   a microprogram read control circuit connected to said microprogram memory for generating read addresses of said microprogram memory, for controlling a sequence of successive generations of read addresses, and for microprogram memory accessed by the generated read addresses,
   a microprogram read-only bus connected to said microprogram memory for transmitting said microinstructions read out from said microprogram memory,
   a decoder connected to said microprogram read-only bus for decoding said microinstructions,
   an image processing circuit connected to said decoder for processing image data based on an output of said decoder, and for operating periodically at a periodically occurring time interval necessary for scanning the image data of one frame, each periodically occurring time interval including a vacant period in which said image processing circuit is not operated, and a real operation period occurring subsequent to said vacant period and in which said image processing circuit processes said image data, and
   timing signal generating means connected to said microprogram read control circuit for generating a timing signal for designating said periodically occurring vacant period, wherein said microprogram read control circuit, responsive to said timing signal, during said periodically occurring vacant period, controls the readout of said microinstructions necessary for operation of said image processing circuit during said real operation period from said microprogram memory.

2. A digital image processing apparatus comprising:
   a microprogram memory for storing a microprogram formed by microinstructions,
   a microprogram read control circuit connected to said microprogram memory for generating read addresses of said microprogram memory, for controlling a sequence of successive generations of the read addresses, and for controlling a readout of microinstructions from said microprogram memory accessed by the generated read addresses,
   a microprogram read-only bus connected to said microprogram memory for transmitting said microinstructions read out from said microprogram memory, a decoder connected to said microprogram readonly bus for decoding said microinstructions, an image processing circuit connected to said decoder for processing image data based on an output of said decoder, and for periodically operating at a time interval necessary for scanning the image data of one frame, the time interval including a vacant period in which said image processing circuit is not operated, and a real operation period occurring subsequent to said vacant period and in which said image processing circuit processes said image data, timing signal generating means connected to said microprogram read control circuit for generating a timing signal for designating said vacant period, wherein said microprogram read control circuit, responsive to said timing signal, during said vacant period, controls the readout of said microinstructions necessary for operation of said image processing circuit during said real operation period from said microprogram memory, a central processing unit connected to said microprogram read control circuit, wherein said central processing unit generates a deciding signal to said microprogram read control circuit for deciding the read addresses, said digital image processing apparatus further comprising a microprogram decoder connected to said microprogram memory and said microprogram read control circuit for decoding a microinstruction read out from said microprogram memory to generate a control signal for controlling operation of said microprogram read control circuit, said microprogram read control circuit comprising a first counter for generating the read addresses of said microprogram memory, and initial value setting means connected to said first counter and said central processing unit for setting an initial value of said first counter based on the deciding signal from said central processing unit.

3. A digital image processing apparatus comprising:

a microprogram memory for storing a microprogram formed by microinstructions, a microprogram read control circuit connected to said microprogram memory for generating read addresses of said microprogram memory, for controlling a sequence of successive generations of the read addresses, and for controlling a readout of microinstructions from said microprogram memory accessed by the generated read addresses, a microprogram read-only bus connected to said microprogram memory for transmitting said microinstructions read out from said microprogram memory, a decoder connected to said microprogram readonly bus for decoding said microinstructions, an image processing circuit connected to said decoder for processing image data based on an output of said decoder, and for periodically operating at a time interval necessary for scanning the image data of one frame, the time interval including a vacant period in which said image processing circuit is not operated, and a real operation period occurring subsequent to said vacant period and in which said image processing circuit processes said image data, timing signal generating means connected to said microprogram read control circuit for generating a timing signal for designating said vacant period, wherein said microprogram read control circuit, responsive to said timing signal, during said vacant period, controls the readout of said microinstructions necessary for operation of said image processing circuit during said real operation period from said microprogram memory, a microprogram decoder connected to said microprogram memory and said microprogram read control circuit for decoding a microinstruction read out from said microprogram memory to generate a control signal for controlling operation of said microprogram read control circuit, said microprogram read control circuit comprising a first counter for generating the read addresses of said microprogram memory, and initial value setting means connected to said first counter and said microprogram decoder for setting an initial value of said first counter based on the control signal from said microprogram decoder.

4. A digital image processing apparatus comprising:

a microprogram memory for storing a microprogram formed by microinstructions, a microprogram read control circuit connected to said microprogram memory for generating read addresses of said microprogram memory, for controlling a sequence of successive generations of the read addresses, and for controlling a readout of microinstructions from said microprogram memory accessed by the generated read addresses, a central processing unit connected to said microprogram memory and to said microprogram read control circuit, for performing a loading operation of said microprogram in said microprogram memory and for controlling operation of said microprogram read control circuit, a microprogram read-only bus connected to said microprogram memory for transmitting said microinstructions read out from said microprogram memory, and a plurality of hardware units connected to said microprogram read-only bus and controlled according to said microinstructions transmitted via said microprogram read-only bus, each of said hardware units including a decoder connected to said microprogram read-only bus, for decoding said microinstructions, an image processing circuit connected to said decoder for processing image data based on an output of said decoder, and for operating periodically at a time interval necessary for scanning the image data of one frame, the time interval including a vacant period in which said image processing circuit is not operated, and a real operation period occurring subsequent to said vacant period in which said image processing circuit processes said image data, and said digital image processing apparatus further comprising timing signal generating means connected to said microprogram read control circuit for generating a timing signal for designating said vacant period, wherein said microprogram read control circuit, responsive to said timing signal, during said vacant period, controls the readout of said microinstructions necessary for operation of said image processing circuit during said real operation period from said microprogram memory.

5. A digital image processing apparatus in accordance with claim 1, wherein said central processing unit generated a deciding signal to said microprogram read control circuit for deciding the read addresses, said digital image processing apparatus further comprising a microprogram decoder connected to said microprogram memory and said microprogram read control circuit for decoding a microinstruction read out from said microprogram memory to generate a control signal for controlling operation of said microprogram read control circuit, said microprogram read control circuit comprising a first counter for generating the read addresses of said microprogram memory, and initial value setting means connected to said first counter and said central processing unit for setting an initial value of said first counter based on the deciding signal from said central processing unit.

6. A digital image processing apparatus in accordance with claim 5, wherein said microinstructions include a jumping instruction having a destination address, and said initial value setting means comprises means for setting as the initial value in said first counter the destination address included in said jumping instruction decoded by said microprogram decoder.

7. A digital image processing apparatus in accordance with claim 5, wherein said microinstructions include a return address setting instruction having a return address and a return instruction, and said initial value setting means comprises a return address register for setting a return address included in said return address setting instruction decoded by said microprogram decoder, and means for substituting a content of said return address register for the initial value in said first counter in response to said return instruction decoded by said microprogram decoder.

8. A digital image processing apparatus in accordance with claim 5, wherein said microinstructions include a conditional jumping instruction having a destination address, and said initial value setting means comprises condition determining means for determining whether or not a jumping condition necessary for said conditional jumping instruction is satisfied, and means for setting as the initial value in said first counter the destination address included in said conditional jumping instruction when said conditional jumping instruction is decoded by said microprogram decoder and said jumping condition is determined to be satisfied by said condition determining means.

9. A digital image processing apparatus in accordance with claim 8, wherein said condition determining means comprises a flag register which is set by said central processing unit, and uses a state of said flag register as said jumping condition.

10. A digital image processing apparatus in accordance with claim 8, wherein said condition determining means comprises a second counter in which an initial value is set by said central processing unit, said microinstructions include a count instruction for causing a content of said second counter to increase or decrease, and the content of said second counter changes in response to said count instruction decoded by said microprogram decoder and said condition determining means uses the content of said second counter as said jumping condition.

11. A digital image processing apparatus in accordance with claim 1, wherein said central processing unit generates a deciding signal to said microprogram read control circuit for deciding the read addresses, said digital image processing apparatus further comprising a microprogram decoder connected to said microprogram memory and said microprogram read control circuit for decoding a microinstruction read out from said microprogram memory to generate a control signal for controlling operation of said microprogram read control circuit, said microprogram read control circuit comprising a first counter for generating the read addresses of said microprogram memory, and initial value setting means connected to said first counter and said microprogram decoder for setting an initial value of said first counter based on the control signal from said microprogram decoder.

12. A digital image processing apparatus in accordance with claim 23, wherein said microinstructions include a jumping instruction having a destination address, and said initial value setting means comprises means for setting as the initial value in said first counter the destination address included in said jumping instruction decoded by said microprogram decoder.

13. A digital image processing apparatus in accordance with claim 11, wherein said microinstructions include a return address setting instruction having a return address and a return instruction, and said initial value setting means comprises a return address register for setting a return address included in said return address setting instruction decoded by said microprogram decoder, and means for substituting a content of said return address register for the initial value in said first counter in response to said return instruction decoded by said microprogram decoder.

14. A digital image processing apparatus in accordance with claim 11, wherein said microinstructions include a conditional jumping instruction having a destination address, and said initial value setting means comprises condition determining means for determining whether or not a jumping condition necessary for said conditional jumping instruction is satisfied, and means for setting as the initial value in said first counter the destination address included in said conditional jumping instruction when said conditional jumping instruction is decoded by said microprogram decoder and said jumping condition is determined to be satisfied by said condition determining means.

15. A digital image processing apparatus in accordance with claim 14, wherein said condition determining means comprises a flag register which is set by said central processing unit, and uses a state of said flag register as said jumping condition.

16. A digital image processing apparatus in accordance with claim 14, wherein said condition determining means comprises a second counter in which an initial value is set by said central processing unit, said microinstructions include a count instruction for causing a content of said second counter to increase or decrease, and the content of said second counter changes in response to said count instruction decoded by said microprogram decoder and said condition determining means uses the content of said second counter as said jumping condition.

* * * * *